United States Patent
Yoh

Patent Number: 6,061,578
Date of Patent: May 9, 2000

[54] COMMUNICATION APPARATUS

[75] Inventor: Choanong Yoh, Matawan, N.J.

[73] Assignee: Lucent Technologies Inc., Murray Hill, N.J.

[21] Appl. No.: 09/034,417

[22] Filed: Mar. 4, 1998

Related U.S. Application Data

[62] Division of application No. 08/928,247, Sep. 12, 1997.

[51] Int. Cl.[7] ............................................. H04Q 7/00
[52] U.S. Cl. ........................... 455/573; 455/90; 455/575; 379/433
[58] Field of Search ............................. 455/90, 575, 573, 455/349, 95, 128; 379/428, 433, 440

[56] References Cited

U.S. PATENT DOCUMENTS

| | | | |
|---|---|---|---|
| 4,881,258 | 11/1989 | Kaiwa et al. | 455/90 |
| 5,185,791 | 2/1993 | Mullersman | 320/25 |
| 5,625,271 | 4/1997 | Shapiro et al. | 320/2 |
| 5,748,727 | 5/1998 | Lundell et al. | 455/90 |

*Primary Examiner*—Edward F. Urban
*Assistant Examiner*—Tilahun Gesesse
*Attorney, Agent, or Firm*—Harry L Newman

[57] ABSTRACT

Communication apparatus is disclosed that comprises a handset 100 that has spaced charging contacts 186, 188 in its lower end 180 and a base 200 that has a recess 220 having a first portion 222 that is shaped to accommodate the handset parallel to the base in either a face in or face out position and a second portion 226 that is shaped to accommodate the handset 100 transverse to the base in either a face in or face out position. The lower end of the first portion 222 of the recess 200 has charging contacts 228 while the lower end of the second portion 224 of the recess has charging contacts 226. The location of the charging contacts 186, 188 in the lower end of the handset 100 and the location of the charging contacts 228 in the lower end of the first portion 222 of the recess 220 is such that the charging contacts 228 are in juxtaposition with the charging contacts 186 in the handset when the handset is placed in the first portion with the front 110 of the handset facing toward the base 200 and in juxtaposition with the charging contacts 188 in the handset when the handset is placed in the first portion with the front of the handset facing away from the base. Similarly, the location of the charging contacts 226 in the lower end of the second portion 224 of the recess 220 is such that the charging contacts 226 are in juxtaposition with the charging contacts 186 in the handset 100 when the handset is placed in the second portion with the front 110 of the handset facing toward the base 200 and in juxtaposition with the charging contacts 188 in the handset when the handset is placed in the second portion with the front of the handset facing away from the base.

10 Claims, 7 Drawing Sheets

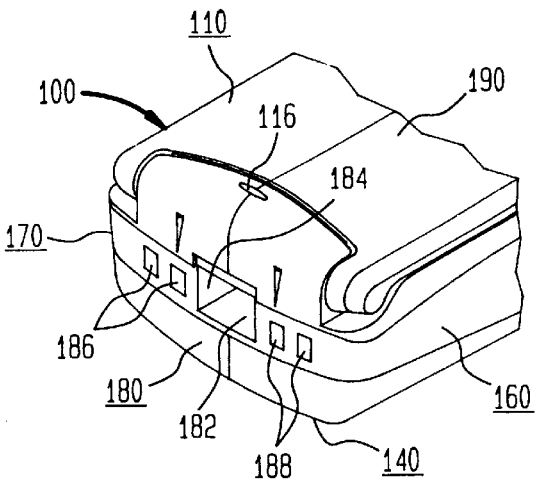
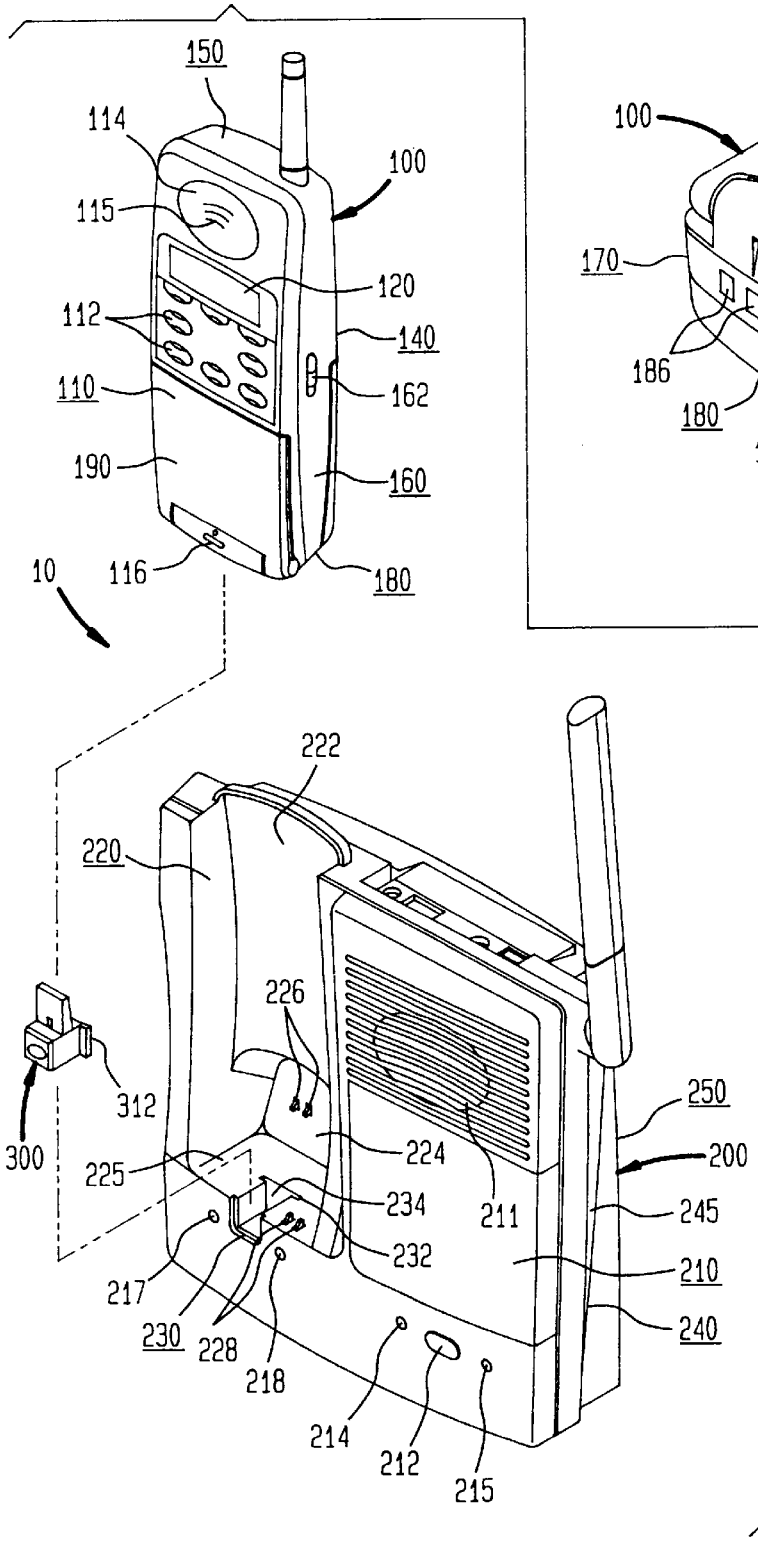

FIG. 3
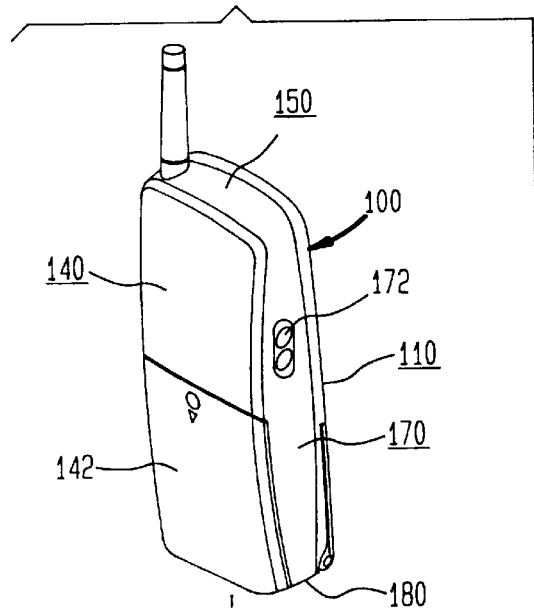
FIG. 4
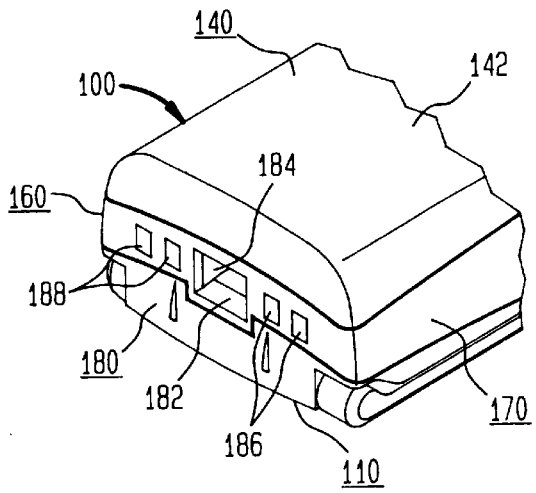
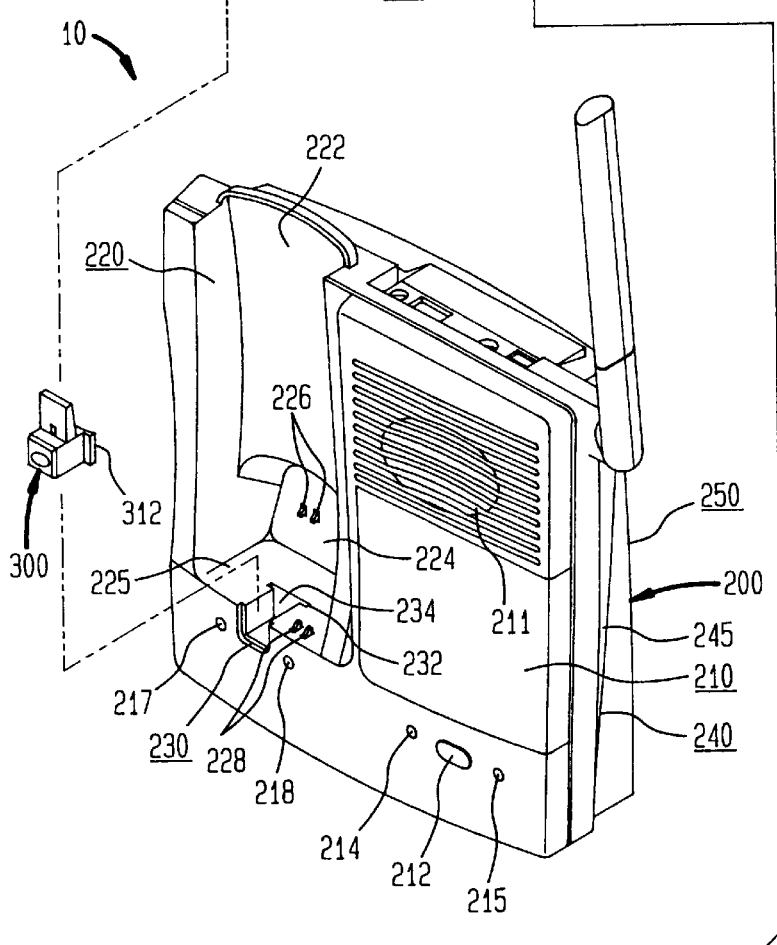

COMMUNICATION APPARATUS

CROSS-REFERENCE TO RELATED APPLICATION

This is a division of copending patent application Ser. No. 08/928,247, filed Sep. 12, 1997.

TECHNICAL FIELD

This invention relates to communication apparatus including a mobile hand held portion, commonly referred to as a handset, that includes a battery for providing power for the operation of the handset and a base on which the handset is positioned when it is desirable to charge the battery in the handset. More particularly, this invention relates to a handset and base interaction that enables the battery in the handset to be charged when the handset is supported on the base in either a face in or face out position and when the handset is positioned either parallel or transverse to the base.

BACKGROUND OF THE INVENTION

The handset commonly employed in communication apparatus comprises a front that includes communication controls, such as push buttons for turning the communication apparatus on and off and a keyboard used for establishing a connection with other communication apparatus and/or transmitting information to other communication apparatus. The front may also include a display for displaying information transmitted or received. The handset further comprises a back, opposite to the front, that is adapted to be held in the palm of the users hand when the handset is removed from the base.

With few exceptions the battery in the handset is charged when the handset is supported on the base in a position parallel to the base and with the handset in a face in position, that is, with the front of the handset facing toward the base. However, it is desirable to be able to be able to charge the battery in the handset when the handset is supported on its associated base either parallel or transverse to the base and in either the face in position or in a face out position in which the front of the handset is facing away from the base and the communication controls and display are accessible to the user while the handset is positioned on its associated base.

One line of cordless telephone set presently available provides the capability of charging the battery in the handset in both a face in and face out position, but only when the handset is supported on the base parallel to the base. In these sets the handset has a pair of opposed recesses in its sides and a charging contact is located in each recess. The base has a pair of opposed spring loaded pins that when placed in registration with the recesses in the handset respectively engage the charging contacts in the handset when the handset is supported on the base in both the face in and face out position.

Another line of cordless telephone sets presently available provides the capability of charging the battery in the handset with the handset supported on the base either parallel or transverse to the base. However, the handset must be in a face in position when parallel to the base and must be in a face out position when transverse to the base. In these sets, the handset has charging contacts on the front of its lower end and the base has charging contacts in a recess that accommodates the lower end of the handset. The charging contacts of the handset only engage the charging contacts of the base when the handset is positioned on the base in the two specified positions.

SUMMARY OF THE INVENTION

Communication apparatus in accordance with the present invention provides an improvement over the prior art designs in that the objective is accomplished in an illustrative embodiment with a handset that has spaced pairs of charging contacts in its lower end and a base that has a recess having a first portion that is shaped to accommodate the handset parallel to the base in either a face in or face out position and a second portion that is shaped to accommodate the handset transverse to the base in either a face in or face out position. Each portion of the recess has a single pair of charging contacts in its lower end. The location of the pairs of charging contacts in the lower end of the handset and the location of the pair of charging contacts in the lower end of each portion of the recess in the base are such that the pair of contacts in each portion of the recess is in juxtaposition with one pair of charging contacts in the handset when the handset is placed in the recess in a face in position and in juxtaposition with the other pair of charging contacts in the handset when the handset is placed in the recess in a face out position.

BRIEF DESCRIPTION OF DRAWINGS

FIG. 1 is an exploded perspective view of communication apparatus that incorporates the present invention, the communication apparatus comprising a handset, a base for accommodating the handset in either a face in or face out position and a securing element for supporting the handset on the base in either of these positions, the handset being shown in the face out position;

FIG. 2 is a perspective view of the lower end portion of the handset in the face out position;

FIG. 3 is the same as FIG. 1 except that the handset is shown in the face in position;

FIG. 4 is a perspective view of the lower end portion of the handset in the face in position;

DETAILED DESCRIPTION OF THE INVENTION

Figure 5:
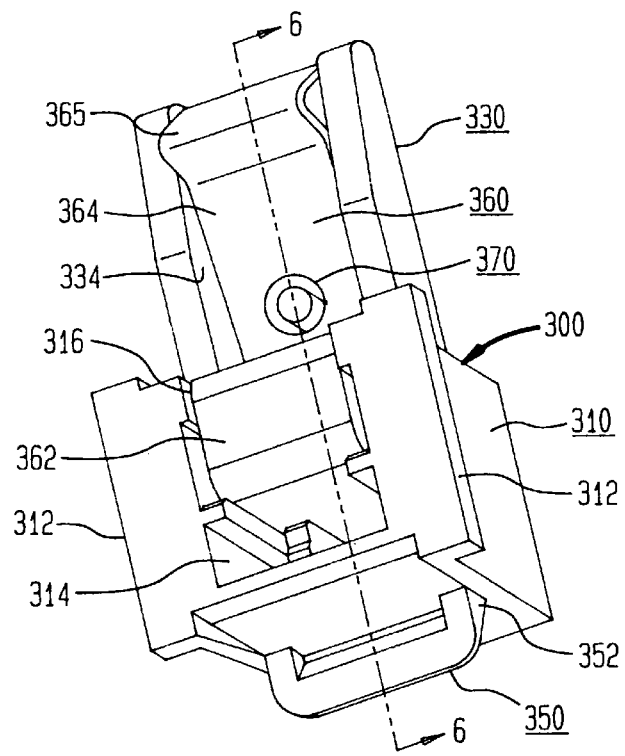
FIG. 5 is an enlarged perspective view of the securing element.

Referring to FIGS. 1 and 3, there is shown an illustrative embodiment of the communication apparatus of the present invention, the illustrative embodiment being a cordless telephone set 10. The set 10 comprises a handset 100, a base 200 on which the handset is positioned when it is at rest and a securing element 300 that mounts on the base and interacts with the handset in a manner later described.

The handset 100 comprises a front 110, a back 140, an upper end 150, sides 160 and 170 and a lower end 180.

Located on the front 110 of the handset 100 are communication controls including push buttons 112 for turning the set on and off and accessing features provided by the set 10. The communication controls also include a push button keyboard (not shown) that is covered by a hinged flap 190 when the flap is in the closed position shown. The keyboard is exposed when the flap 190 is rotated to an open position and can then be used to establish a connection with other communication apparatus and/or transmitting information to other communication apparatus.

The front 110 of the handset 100 further includes a concave recess 114 at its upper end having slots 115 for accessing an audio receiver (not shown) and slots 116 at its lower end for accessing an audio transmitter (not shown). Finally, the front 110 of the handset 100 includes a display 120 for displaying information generated by the communication controls of the handset or information received from other communication apparatus.

The back 140 of the handset 100 is adapted to be held in the palm of a users hand when the handset is removed from the base 200, and when so held, the user can use the other hand to operate the communication controls of the handset. The back 140 includes a panel 142 that is user removable to replace a rechargeable battery (not shown) that provides the power needed to operate the set 10 using the communication controls of the handset 100. The sides 160 and 170 of the handset 100 may include controls such as a slide switch 162 for reducing power consumption and a toggle switch 172 for controlling the volume of the audio receiver.

Referring now to FIGS. 2 and 4, the lower end 180 of the handset 100 includes an opening 182 that is essentially located equidistant between the sides 160 and 170 and between the front 110 and the back 140, and the opening has interior walls 184. The opening 182 is straddled by two pairs of charging contacts 186 and 188 that are used to charge the battery in the handset 100 when the handset is positioned on the base 200.

Referring again to FIGS. 1 and 3, the base 200 includes a front 210 and a back 240. The back 240 is inclined to the front 210 so that it is a greater distance from the front at the upper end of the base 200 than it is at the lower end of the base, providing the base with side portions 245 that have a wedge shaped profile. In addition, a wedge shaped pedestal 250 snap mounts to the back 240 in either of two positions 180 degrees disposed from one another. In a first position, the wedge of the pedestal 250 is additive to the wedge of the base 200. As a result, the incline of the front 210 of the base 200 is increased so that the upper end of the front is a far greater distance from the bottom of the pedestal than the lower end of the front. This provides the desired positive incline to the front 210 when the base 200 is supported on a horizontal surface. In the second position of the pedestal 250, the wedge of the pedestal is subtractive to the wedge of the base 200. As a result, the incline of the front 210 is decreased to the point that the upper end of the front is a somewhat smaller distance from the bottom of the pedestal 250 than the lower end of the front. This provides the desired negative incline to the front 210 when the base 200 is supported on a vertical surface.

The front 210 has an intercom speaker 211 and a push button 212 for initiating or responding to an intercom call. It also includes lights 214 and 215 that respectively indicate when the intercom or phone are in use and lights 217 and 218 that, when the handset 100 is in a rest position on the base 200, respectively indicate when the battery in the handset is charging or fully charged.

The front 210 of the base 200 also has a recess 220 including a first portion 222 that is shaped to be juxtaposed with either the front 110 or back 140 of the handset 100. This enables the handset 100 to be placed in the recess 220 either face in or face out in a parallel position to the front 210 of the base 200. The recess 220 also has a second portion 224 that is deeper than the first portion 222 and is shaped to accommodate the lower end portion of the handset 100. This enables the handset 100 to be placed in the recess 220 in an upright position when the base 200 is supported on a horizontal surface. The recess 220 further includes a lower end 225 that faces the lower end 180 of the handset 100 when the handset is placed in the recess in the parallel position.

Referring also to FIGS. 2 and 4, the second portion 224 of the recess 220 has a pair of resilient charging contacts 226 protruding from its surface. Consequently, when the handset 100 is placed in the second portion 224 in an upright position, these charging contacts 226 are engaged by either the charging contacts 186 or 188 on the lower end 180 of the handset, depending upon whether the front 110 or the back 140 of the handset is facing the lower end of the handset. Similarly, the lower end 225 of the recess 220 has a pair of resilient charging contacts 228 protruding from its surface. Consequently, when the handset 100 is placed in the recess 220 in a parallel position, these charging contacts are engaged by either the charging contacts 186 or 188 on the lower end 180 of the handset, depending upon whether the handset is in a face in or face out position. Thus it is seen that the battery in the handset 100 can be charged in any one of four different positions of the handset on the base 200.

Figure 6:
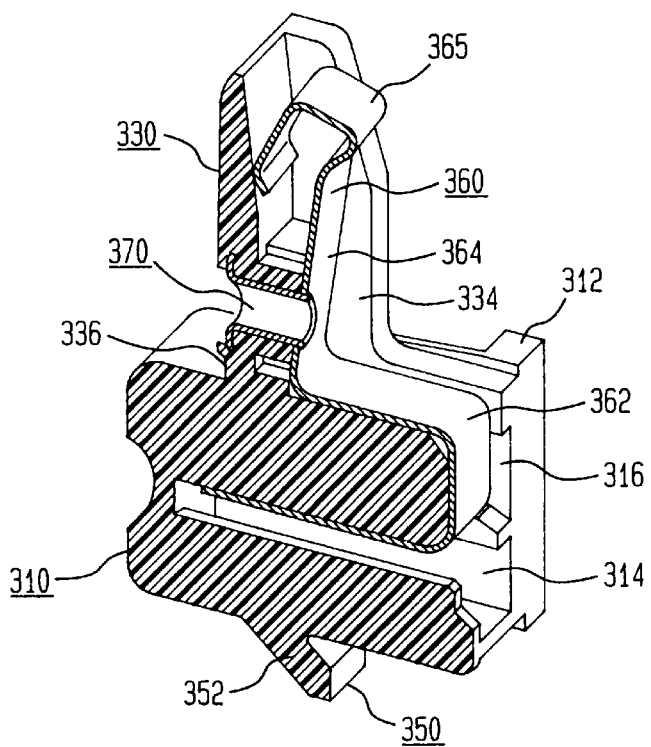
FIG. 6 is a cross-sectional perspective view of the securing element taken along line 6—6 of FIG. 5.

In addition to the charging contacts 228, the lower end 225 of the recess 220 has a cavity 230 that is shaped to accommodate the securing element 300, the cavity including a pair of laterally extending grooves 232 adjacent to a back wall 234. As seen most clearly in FIGS. 5 and 6, the securing element 300 comprises a block like middle portion 310, a long end portion 330 extending from one end of the middle portion, and a short end portion 350 extending from the opposite end of the middle portion. The back end of the middle portion 310 includes a pair of laterally extending flanges 312 of a size to be accommodated by the grooves 232 (FIG. 1) in the cavity 230. The back end of the middle portion 310 also includes a recess 314 and channel 316 that connect to one another.

Figure 7:
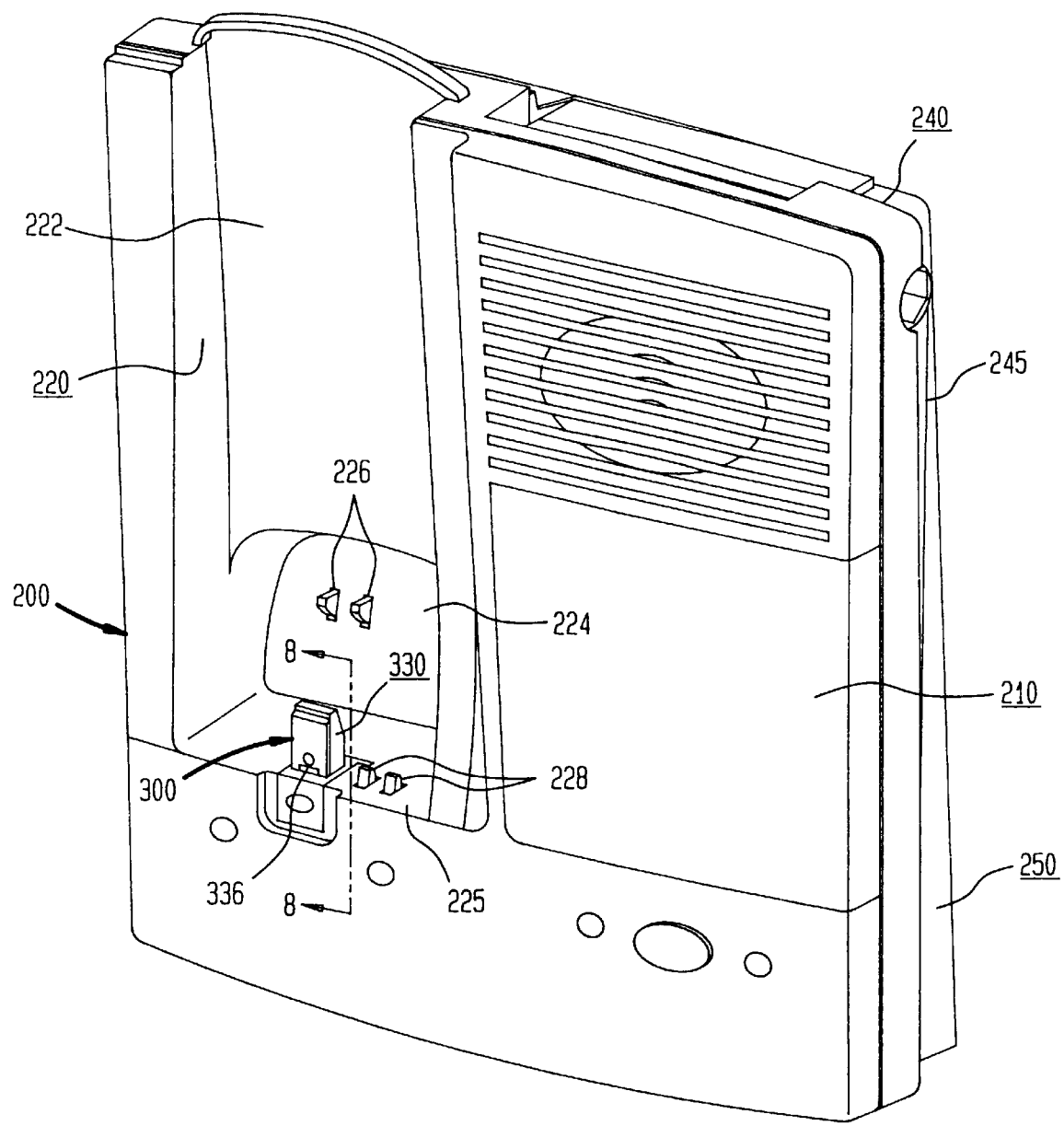
FIG. 7 is a perspective view of the base with the securing element in place and oriented so as to support the handset on the base in either a face in or face out position when the base is positioned on a vertical surface.

The long end portion 330 has a channel 334 in its back that joins with the channel 316 and recess 314 in the middle portion 310, and a serpentine spring member 360 is mounted in the recess and the channels. The spring member 360 includes a U shaped portion 362 that extends from the recess 314 and through the channel 316 in the middle portion 310. The spring member 360 also includes a leg portion 364 that extends through the channel 334 in the long end portion 330, the end of the leg portion bending back on itself to form a nose portion 365 that extends outside the channel. The spring member 360 is held in place by a rivet that extends through a hole in the long end portion 330 and the leg portion 364 and is swaged over against the leg portion. The long end portion 330 also has a recess 336 in its front adjacent to the middle portion 310 (Seen also in FIG. 7). The short end portion 350 includes an angled protrusion 352.

Figure 8:
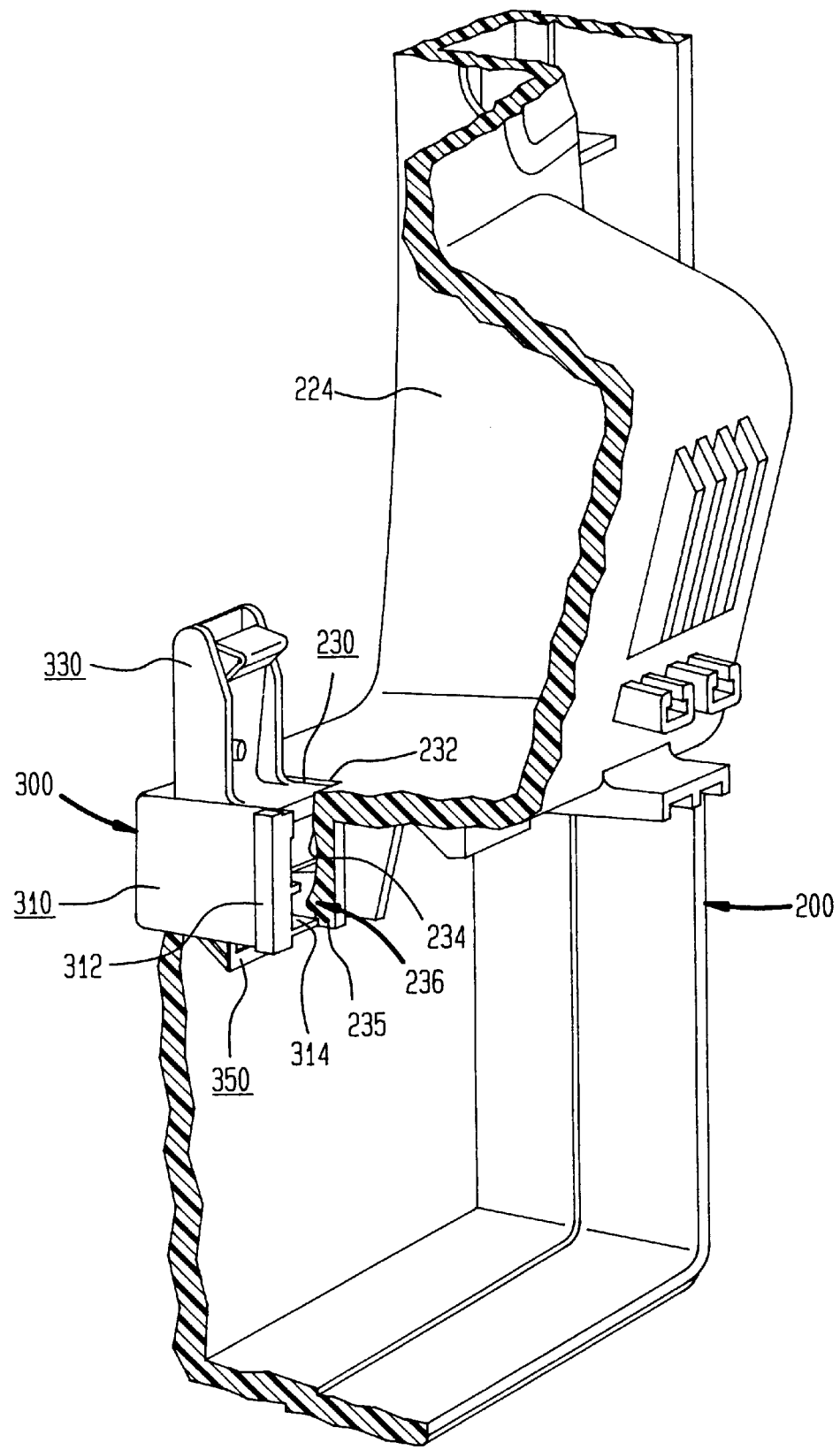
FIG. 8 is an enlarged cross-sectional perspective view taken along line 8—8 of FIG. 7.
Figure 9:
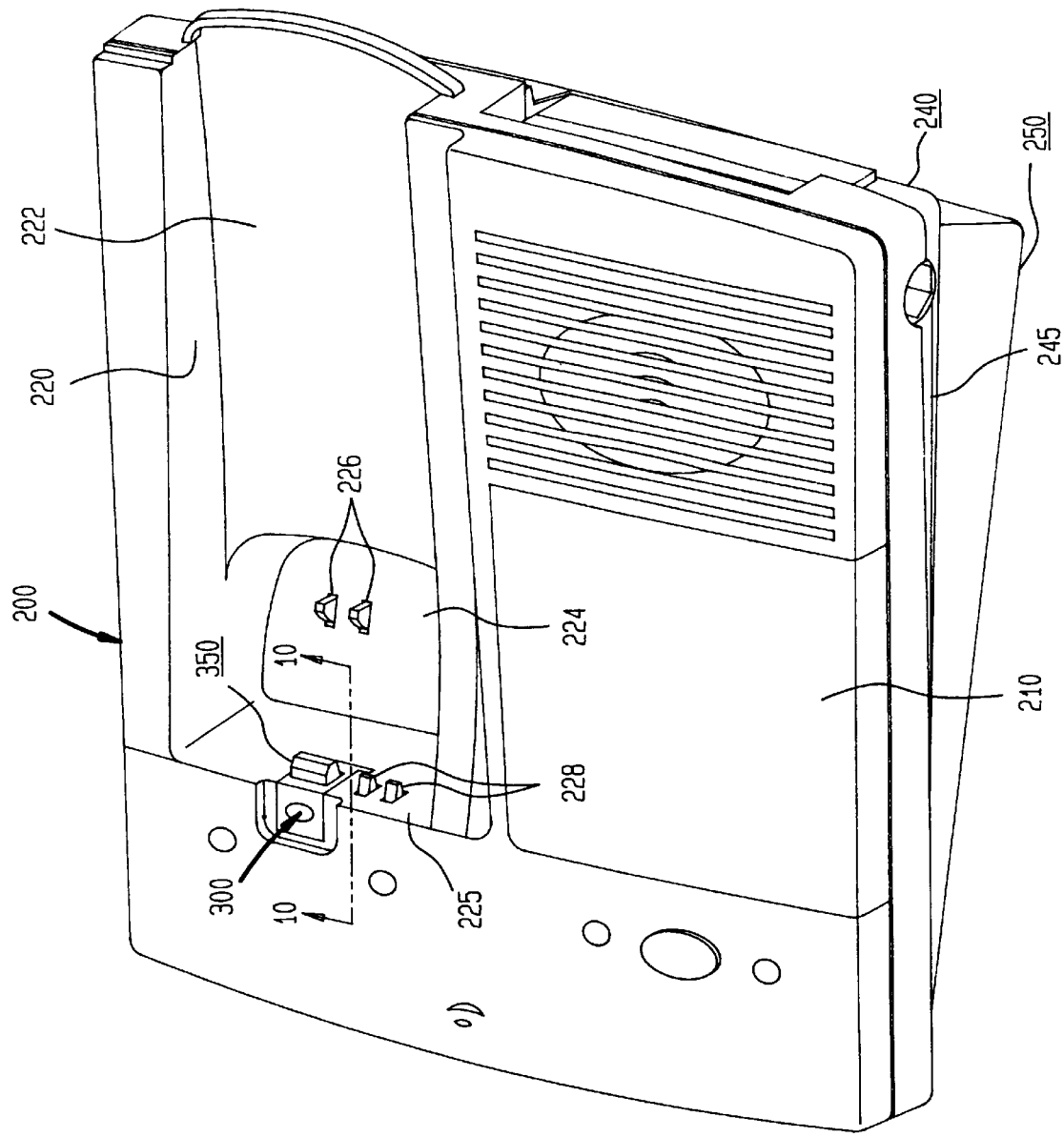
FIG. 9 is a perspective view of the base with the securing element in place and oriented so as to support the handset on the base in either a face in or face out position when the base is positioned on a horizontal surface.
Figure 10:
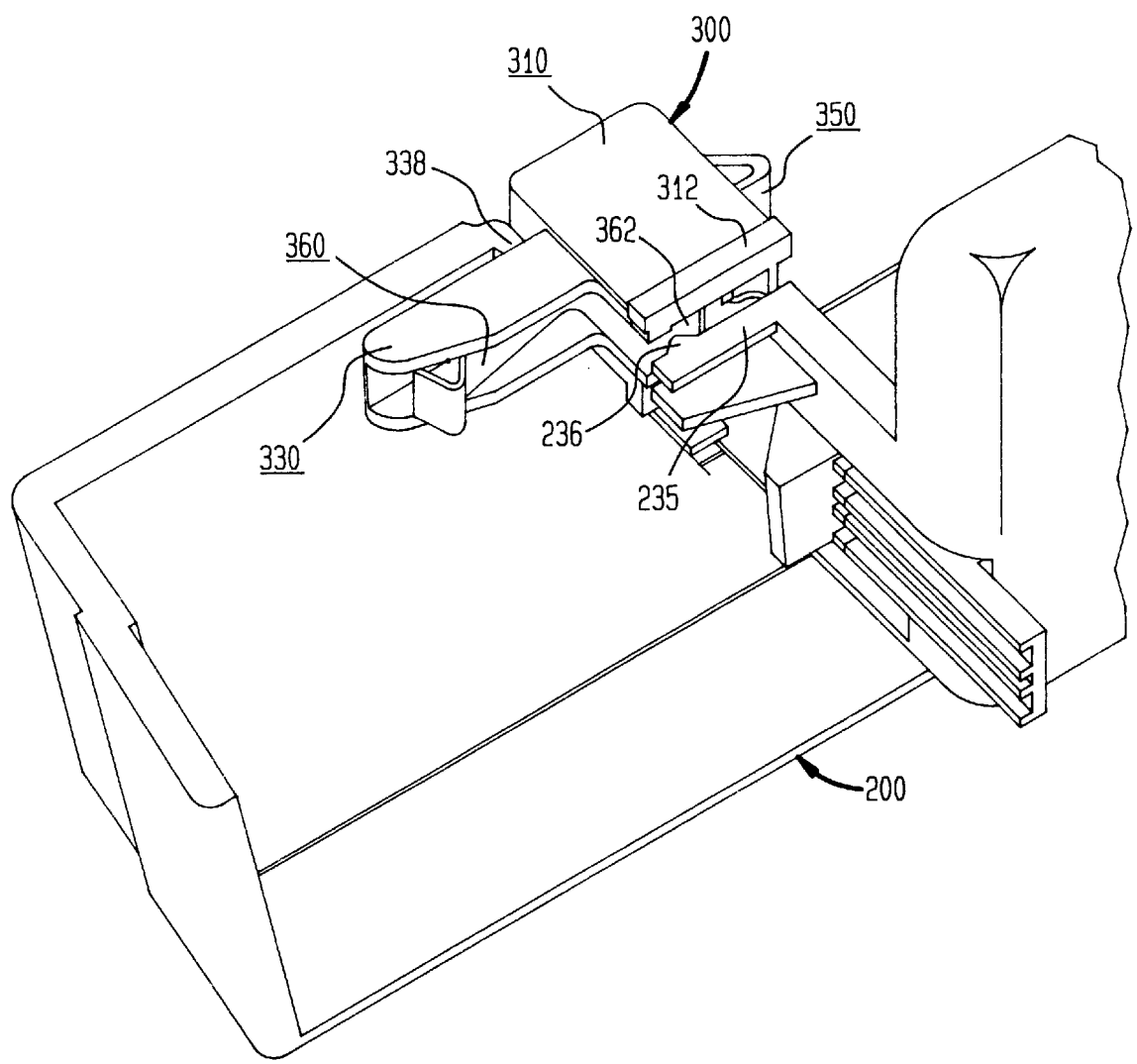
FIG. 10 is an enlarged cross-sectional perspective view taken along line 10—10 of FIG. 9.

Turning now to FIGS. 1, 3, 7 and 8, when the base 200 is to be supported on a vertical surface, the securing element 300 is mounted in the cavity 230 in the lower end 225 of the recess 220 with the flanges 312 of the securing element positioned in the grooves 232 of the recess, the long end portion 330 of the securing element protruding outwardly from the lower end 225 of the recess, and the short end portion 350 of the securing element extending into the interior of the base through a hole in the cavity As seen most clearly in FIG. 8, the securing element 300 is held in place by a flexible finger 235 that is integral to the back wall 234 of the cavity 230. The finger 235 has a nose portion 236, and when the securing element 300 is fully inserted into the cavity 230, the nose portion of the finger moves into the recess 314 in the middle portion 310 to frictionally hold the securing element in place.

Referring now to FIGS. 1–4 and 7, with the securing element 300 mounted on the base 200 in this position and the base supported on a vertical surface, the handset 100 is placed in the recess 220 in the base, either face in or face out, in a parallel position to the front 210 by a natural downward motion. As a result, the long end portion 330 of the securing element 300 moves into the opening 182 in the lower end 180 of the handset 100 and the nose portion 365 of the spring member 360 frictionally engages an adjacent wall of the opening. This interaction between the securing element 300 on the base 200 and the opening 182 in the handset serves to secure the handset in place.

Turning now to FIGS. 1, 3, 9 and 10, when the base 200 is to be supported on a horizontal surface, the securing element 300 is mounted in the cavity 230 in the lower end 225 of the recess 220 with the flanges 312 of the securing element positioned in the grooves 232 of the recess, the short end portion 350 of the securing element protruding outwardly from the lower end 225 of the cavity, and the long end portion of the securing element extending into the interior of the base through a hole in the cavity. As seen most clearly in FIG. 10, the front end of the cavity 230 includes a protrusion 338, and when the securing element 300 is inserted into the cavity in this position, the recess 336 (FIG. 6) in the securing element is moved into juxtaposition with the protrusion and the protrusion moves into the recess to hold the securing element in place.

Referring now to FIGS. 1–4 and 9, with the securing element 300 mounted on the base 200 in this position and the base supported on a horizontal surface, the handset 100 is placed in the recess 220 in the base, either face in or face out, in a parallel position to the front 210. Since, as described above, when the base is supported on a horizontal surface, the pedestal 250 is oriented so as to provide a positive incline to the front 210, the handset 100 also has a positive incline. As a result, gravity essentially moves the lower end 180 of the handset 100 into juxtaposition with the lower end 225 of the recess 220, thereby placing the short end portion 350 of the securing element 300 in juxtaposition with the opening 182 in the lower end of the handset. The protrusion 352 of the short end portion 350 of the securing element 300 frictionally engages the entrance to the opening 182 and serves to prevent the contacts 186 or 188 on the lower end 180 of the handset 100 from engaging the contacts 228 on the lower end 225 of the recess 220 with too much force.

While the preferred embodiment of this invention has been described in the Detailed Description, the scope of this invention is defined by the following claims.

What is claimed is:

1. Communication Apparatus comprising a handset and a base adapted to support the handset, the handset having a front and a back, the handset also having a batter for providing power to the handset, the handset further having a lower end extending between the front and the back, the lower end of the handset having one or more charging contacts for charging the battery, the base including a recess that accommodates the handset in either a face in position in which the front of the handset is facing toward the base or a face out position in which the front of the handset is facing away from the base, the recess including a lower end that is in juxtaposition with the lower end of the handset when the handset is positioned in the recess, the lower end of the recess having one or more charging contacts for engaging one or more charging contacts in the lower end of the handset in both the face in and face out positions, one of the lower ends having fewer charging contacts than the other of the lower ends, whereby not all of the charging contacts in the other lower end engage charging contacts in the one lower end when the handset is positioned in the recess in either the face in position or the face out position.

2. Communication apparatus as in claim 1 wherein the recess has a first portion that supports the handset in a position parallel to the base in either the face in position or the face out position and a second portion that supports the handset in a position transverse to the base in either the face in position or the face out position.

3. Communication apparatus as in claim 2 wherein both the first and the second portions of the recess have one or more charging contacts in its lower end for engaging one or more charging contacts in the lower end of the handset in either the face in or face out position.

4. Communication apparatus as in claim 3 wherein the lower end of the second portion of the recess is in juxtaposition with the lower end of the handset when the handset is positioned in the second portion in a position transverse to the base, one of the lower ends having fewer charging contacts than the other of the lower ends, whereby not all of the charging contacts in the other lower end engage charging contacts in the one lower end when the handset is positioned in the second portion of the recess in either a face in position or a face out position.

5. Communication apparatus comprising:
   a first unit having a front, back and lower end, the first unit including electrical contacts;
   a second unit having a portion for accommodating the first unit with the front of the first unit either facing toward or away from the second unit, the accommodating portion including electrical contacts, some of the electrical contacts in one of the units engaging electrical contacts in the other unit when the first unit is positioned in the accommodating portion with the front of the first unit facing toward the second unit and other of the electrical contacts in the one unit engaging electrical contacts in the other unit when the first unit is positioned in the accommodating portion with the front of the first unit facing away from the second unit.

6. Communication apparatus as in claim 5 wherein the accommodating portion of the second unit accommodates the first unit both in a position parallel and transverse to the second unit with the front of the first unit either facing toward or away from the second unit, the accommodating portion being in juxtaposition with the lower end of the first unit when the first unit is positioned in the accommodating portion either parallel or transverse to the second unit with the front of the first unit either facing toward or away from the second unit, both the lower end of the first unit and the accommodating portion of the second unit including electrical contacts, electrical contacts in the accommodating portion engaging electrical contacts in the lower end of the first unit when the first unit is positioned in the accommodating portion either parallel or transverse to the second unit with the front of the first unit either facing toward or away from the second unit.

7. Communication apparatus as in claim 6 wherein some of the electrical contacts in the lower end of the first unit engage electrical contacts in the accommodating portion of the second unit when the first unit is positioned in the accommodating portion with the front of the first unit facing toward the second unit and other of the electrical contacts in the lower end of the first unit engage electrical contacts in the accommodating portion when the first unit is positioned in the accommodating portion with the front of the first unit facing away from the second unit.

8. Communication apparatus comprising:

a first unit including a front, back, upper end and lower end, the first unit having one or more electrical contacts; and a second unit including an accommodating portion for supporting the first unit with the front of the first unit either facing toward or away from the second unit, the accommodating portion having one or more electrical contacts for engaging one or more electrical contacts in the first unit when the first unit is supported on the second unit with the front of the first unit either facing toward or away from the second unit, one of the units having fewer electrical contacts than the other unit.

9. Communication apparatus as in claim 8 wherein the accommodating portion of the second unit supports the first unit in a position transverse to the second unit.

10. Communication apparatus as in claim 9 wherein the accommodating portion of the second unit also supports the first unit in a position parallel to the second unit.

* * * * *